(12) United States Patent
Chen et al.

(10) Patent No.: US 7,778,719 B2
(45) Date of Patent: Aug. 17, 2010

(54) METHOD, SYSTEM, APPARATUS, AND COMPUTER-READABLE MEDIUM FOR PROVIDING CONFIGURE TO SERVICE FOR A SEMICONDUCTOR MANUFACTURING SERVICE GUIDE SYSTEM

(75) Inventors: Edward C. K. Chen, Hsin Chu (TW); Fa-Liang Wang, Hsinchu (TW); Hector Stuart Godley, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 693 days.

(21) Appl. No.: 11/610,362

(22) Filed: Dec. 13, 2006

(65) Prior Publication Data

US 2007/0276527 A1 Nov. 29, 2007

Related U.S. Application Data

(60) Provisional application No. 60/750,140, filed on Dec. 14, 2005.

(51) Int. Cl.
*G06F 19/00* (2006.01)
(52) U.S. Cl. .................................. 700/95; 700/121

(58) Field of Classification Search ............. 700/95–97, 700/100–105, 106, 116, 121; 705/28, 29; 235/375, 385, 407.7, 429
See application file for complete search history.

(56) References Cited

U.S. PATENT DOCUMENTS

| | | | |
|---|---|---|---|
| 6,424,878 B1 * | 7/2002 | Barker et al. | 700/121 |
| 6,499,657 B1 * | 12/2002 | van Abeelen et al. | 235/375 |
| 6,711,798 B2 * | 3/2004 | Sanders et al. | 29/407.01 |
| 6,748,286 B1 * | 6/2004 | Losch | 700/97 |
| 6,871,110 B1 * | 3/2005 | Yen et al. | 700/100 |
| 7,315,827 B2 * | 1/2008 | Hshieh et al. | 705/7 |
| 7,480,539 B2 * | 1/2009 | Suttile et al. | 700/121 |
| 7,613,534 B1 * | 11/2009 | Yazback et al. | 700/96 |

* cited by examiner

*Primary Examiner*—Kidest Bahta
(74) *Attorney, Agent, or Firm*—Haynes and Boone, LLP

(57) ABSTRACT

A system, method, apparatus, and computer-readable medium for generating a code for a semiconductor manufacturing system are provided. A first code segment is derived from a customer code uniquely associated with a customer. At least one additional code segment is derived from at least one attribute selected for a semiconductor product ordered by the customer. A configure-to-service code is generated in a service guide system from the first code segment and the at least one additional code segment.

30 Claims, 9 Drawing Sheets

| File | Edit | View | Favorites | Tools | Help |

Application:

| ☐ 1TRAM | 310a | ☐ BiCMOS | 310g | ☐ Color Filter | 310m |
| --- | --- | --- | --- | --- | --- |
| ☐ DRAM | 310b | ☐ EEPROM | 310h | ☐ EPROM | 310n |
| ☐ Embedded DRAM | 310c | ☐ Embedded SRAM | 310i | ☐ Flash | 310o |
| ☐ Flip-Chip | 310d | ☐ High Voltage | 310j | ☐ Image Sensor | 310p |
| ☐ Logic | 310e | ☐ Mask ROM | 310k | ☐ Mixed Signal/RF | 310q |
| ☐ Packaging/Testing | 310f | ☐ SRAM | 310l | ☐ All | 310r |

310 311

Technology Geometry:

| ☐ 65nm | 311a | ☐ 80nm | 311i | ☐ 90nm | 311q |
| --- | --- | --- | --- | --- | --- |
| ☐ 0.11μm | 311b | ☐ 0.13μm | 311j | ☐ 0.15μm | 311r |
| ☐ 0.16μm | 311c | ☐ 0.18μm | 311k | ☐ 0.22μm | 311s |
| ☐ 0.25μm | 311d | ☐ 0.35μm | 311l | ☐ 0.3μm | 311t |
| ☐ 0.42μm | 311e | ☐ 0.45μm | 311m | ☐ 0.4μm | 311u |
| ☐ 0.5μm | 311f | ☐ 0.6μm | 311n | ☐ 0.8μm | 311v |
| ☐ 1.0μm | 311g | ☐ 1.2μm | 311o | ☐ 1.5μm | 311w |
| ☐ 2.0μm | 311h | ☐ 3.0μm | 311p | ☐ All | 311x |

312

I/O Voltage:

| ☐ 1.0V | 312a | ☐ 1.2V | 312d | ☐ 1.5V | 312g |
| --- | --- | --- | --- | --- | --- |
| ☐ 1.8V | 312b | ☐ 12V | 312e | ☐ 16V | 312h |
| ☐ 2.5V | 312c | ☐ 20V | 312f | ☐ 3.3V | 312i |

Fig. 4

| | ATTRIBUTE | Att_Class | CODE |
|---|---|---|---|
| $420_1$ | 1TRAM | APPLICATION | 1 |
| $420_2$ | DRAM | APPLICATION | 2 |
| $420_3$ | EMBEDDED DRAM | APPLICATION | 3 |
| $420_4$ | FLIP-CHIP | APPLICATION | 4 |
| $420_5$ | LOGIC | APPLICATION | 5 |
| $420_6$ | PACKAGING AND TESTING | APPLICATION | 6 |
| ⋮ | ⋮ | ⋮ | ⋮ |
| $420_{48}$ | 1.6 | IO VOLTAGE | 48 |
| $420_{49}$ | 3.3 | IO VOLTAGE | 49 |

| | Master_Code | Service_Stage |
|---|---|---|
| $620_1$ | Master_Code_1 | 01 |
| $620_2$ | Master_Code_2 | 02 |
| $620_3$ | Master_Code_3 | 04 |

| | SERVICE STAGE | DATA STRUCTURE |
|---|---|---|
| $660_1$ | 01 | Data_Structure_1 |
| $660_2$ | 02 | Data_Structure_2 |
| $660_3$ | 03 | Data_Structure_3 |
| $660_4$ | 04 | Data_Structure_4 |
| $660_5$ | 05 | Data_Structure_5 |
| $660_6$ | 06 | Data_Structure_6 |

650

$670_2$  $670_1$

670

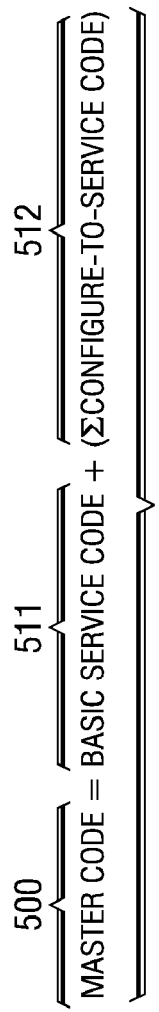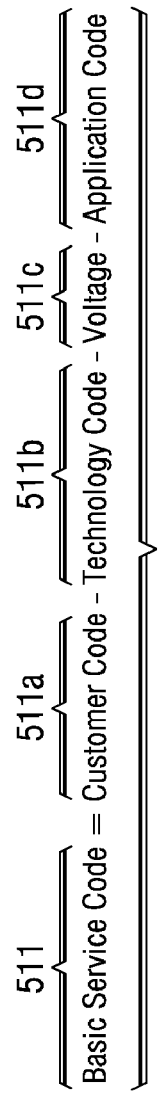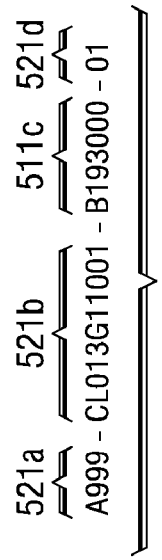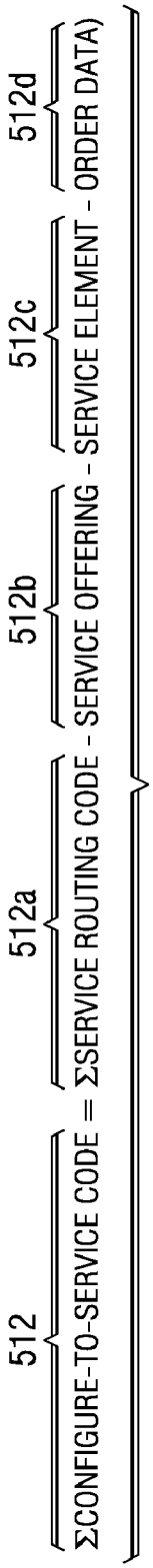
Fig. 5A
Fig. 5B
Fig. 5C
Fig. 5D

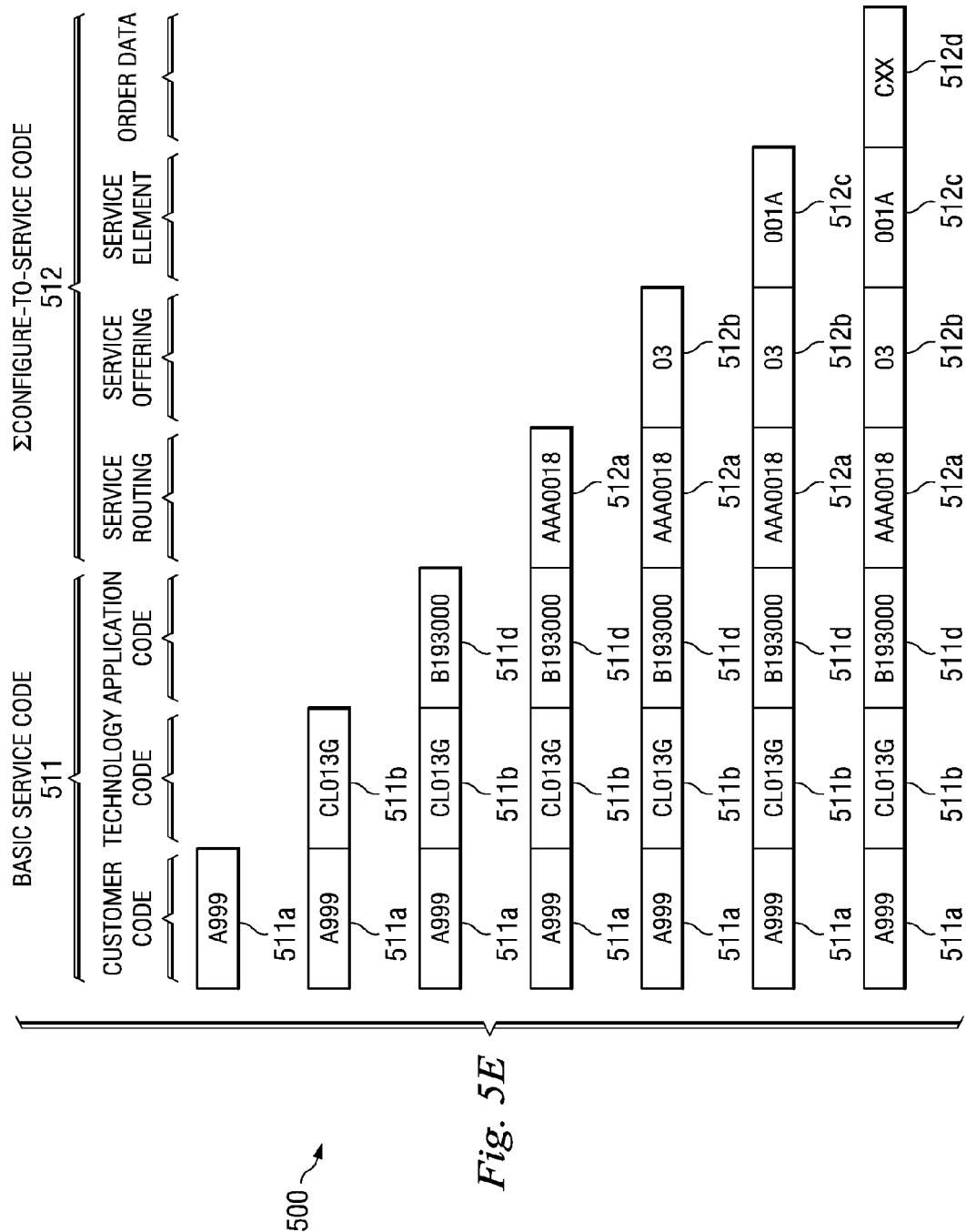

METHOD, SYSTEM, APPARATUS, AND COMPUTER-READABLE MEDIUM FOR PROVIDING CONFIGURE TO SERVICE FOR A SEMICONDUCTOR MANUFACTURING SERVICE GUIDE SYSTEM

RELATED APPLICATION DATA

This application claims priority to U.S. provisional patent application Ser. No. 60/750,140, entitled, METHOD, SYSTEM, APPARATUS, AND COMPUTER-READABLE MEDIUM FOR PROVIDING A SERVICE GUIDE FOR A SEMICONDUCTOR MANUFACTURING SYSTEM, filed Dec. 14, 2005, by Chen, et al, the disclosure of which is incorporated herein by reference.

FIELD OF THE INVENTION

This invention relates to the field of semiconductor manufacturing systems. More particularly, this invention relates to providing a service guide that is adapted to provide information exchanges between various manufacturing facilities or service providers and customers. Still more particularly, this invention relates to a service guide implemented in a manufacturing system that provides for information exchange, delivery, and order management or product order by a configure to service business method.

BACKGROUND

In manufacturing systems, such as the semiconductor industry, the development of a new device may involve multiple production parties or production stages, including non-integrated device manufacturers (non-IDM) such as fabless design houses, foundry service providers, mask service providers and assembly/test houses, and finally the device manufacturer itself that will produce the devices. Therefore, throughout the device design, production, verification, and test engineering cycle, a large volume of data must be exchanged between these parties.

Various production stages may, and often are, performed at separate facilities that may be located at various geographic locations. Manufactures may deploy information systems that facilitate customer order processing, delivery of information to customers regarding the processing of customer orders, and that provide a level of interactivity for the customer to participate in a manufacturing stage. However, conventional information systems deployed in a manufacturing system that includes various production stages that may be deployed at various and distinct locales do not integrate information in a seamless manner for presentation to a user such as a customer. For example, information systems deployed in the semiconductor manufacturing industry require a customer to have knowledge of a particular processing stage to obtain information regarding a customer order. Process-centric service guide codes are generated and assigned to a customer order that allows the customer to interface with the information system and obtain or supply information regarding a particular production stage of a product order. A plurality of such service guide codes is thus necessary for the customer to interact with the information system over the course of the production life cycle. Moreover, a customer is often unaware of a particular production stage in which a product is being processed.

BRIEF DESCRIPTION OF FIGURES

Aspects of the present disclosure are best understood from the following detailed description when read with the accompanying figures, in which:

FIG. 3 is a diagrammatic representation of an embodiment of a product menu that may be provided by a gateway that facilities operation of a service guide in a semiconductor manufacturing system;

FIG. 4 is a diagrammatic illustration of a data structure that provides an association between product attributes and codes that may be used for generation of a service guide code;

FIG. 5A is a diagrammatic illustration of an exemplary master code format that facilitates implementation of a service guide in a semiconductor manufacturing system;

FIG. 5B is a diagrammatic representation of an embodiment of a basic service code segment;

FIG. 5C is a diagrammatic representation of an embodiment of an exemplary basic service code segment;

FIG. 5D is a diagrammatic representation of an embodiment of a configure-to-service code segment;

FIG. 5E is a diagrammatic representation of an embodiment of a master code depicting exemplary basic service code segment and configure-to-service code segment values;

FIG. 6A is a diagrammatic illustration of an embodiment of a mapping table that may be maintained or accessible by a gateway that facilitates recording of a service stage of a semiconductor product;

FIG. 6B is a diagrammatic illustration of an embodiment of a mapping table that may be maintained or accessible by a gateway that facilitates conveyance of semiconductor product manufacturing process data to a user of a service guide in a semiconductor manufacturing system;

DETAILED DESCRIPTION

Figure 1:
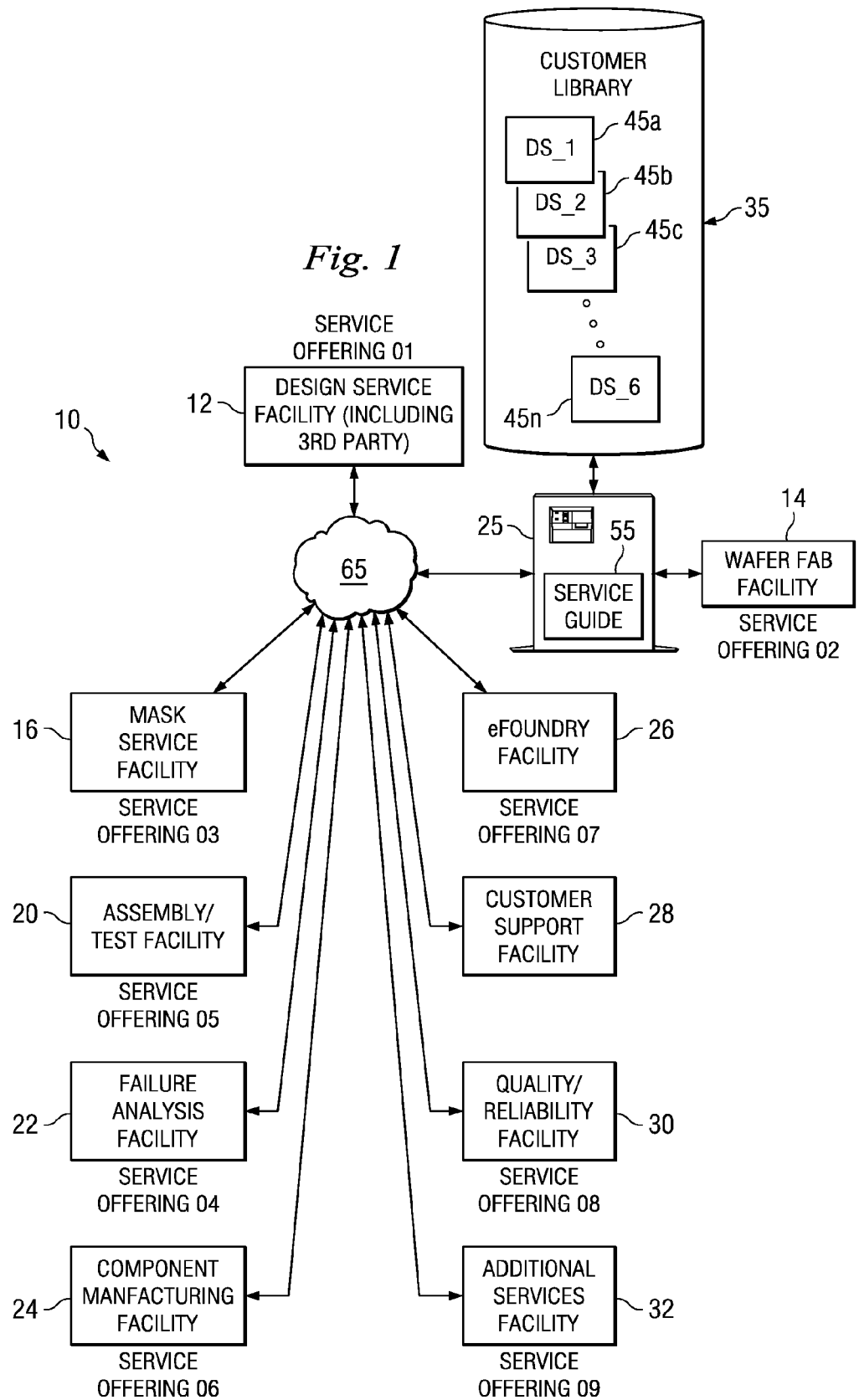
FIG. 1 is a simplified block diagram of an embodiment of a semiconductor manufacturing system in which a service guide may be implemented to facilitate data exchanges across a semiconductor production cycle.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Existing service guide and product order tracking mechanisms are service provider-centric in that they are only tailored for providing information, such as operational efficiency or progress, of a particular service provider entity, such as an assembly/test facility. Conventional service guide implementations do not provide for any unified product order view or status that may provide insight across multiple service providers. In semiconductor manufacturing systems, for example, numerous service providers and partners may be involved in the end-to-end processing of a product order. Conventional service guides implemented in such multi-staged manufacturing and processing systems provide for product order information relative to a single processing stage, and heretofore no mechanism exists for unifying product processing and customer and service provider activities in a uniform manner.

In accordance with embodiments disclosed herein, a service platform that integrates customers' activities and activity information along an entire processing chain is provided. As referred to herein, a processing chain is a system of a plurality of service providers that each may respectively provide a service to a product order. The service platform provides for internal service processing and external service processing cross referencing. That is, the service platform provides for mechanisms that correlate internal services and activities (whether provider activities or customer activities) that are provided within a particular service hosting the service platform with services and activities that are provided external to the hosting entity, e.g., by service providers that provide third party services in the processing chain. Third party services may be provided by, for example, service partners to a central service provider, such as a semiconductor Foundry. The service platform facilitates generation and management of a configure-to-service code that integrates respective process codes and processes that may be provided by any number of service providers, including third party entities, in a centralized product order information distribution platform.

The configure-to-service code may be included in a master code and allows customers to track and trace product orders with a central vendor or service provider, such as a semiconductor Foundry service. Likewise, the configure-to-service code allows for the central vendor to track and trace the customers product order and customer activities.

The service platform disclosed herein provides for a flexible, multi-layered service guide that facilitates implementation of a structured information gateway, and allows for application of a configure-to-service code for efficient customer management and cross-reference to various service providers, integration of business data, efficient information gathering, and facilitates tracking information throughout a product service chain.

Embodiments disclosed herein provide mechanisms for integrating information services across various production stages of a production process or system. A service platform facilitates customer interaction throughout an entire production process that may include a plurality of distinct production stages performed at a plurality of distinct geographic locales. Production stages may be provided by one or more product manufacturers or service providers. A service guide facilitates business transactions, and management and information distribution thereof, between service providers and customers in an efficient manner, and provides a foundation for service delivery, management and communications for both customer demands and service providers across the processing chain. A configure-to-service code provides a one-code management for integrating and streamlining cross-service offerings and service usage across a network or system that may include any number of customers and service providers. The configure-to-service code may be derived or otherwise generated and is assigned to a customer order. A master code that may include the configure-to-service code may be derived, in whole or in part, on one or more of a customer identifier, product design parameter(s) or attributes, or other product or manufacturing characteristics. The master code allows customers to track the process of an order by interfacing with, for example, a gateway accessible by a data network, such as the Internet. The gateway may provide an environment personalized on a per-customer basis that facilitates establishment of a business profile and the archival of historical transaction information.

FIG. 1 is a simplified block diagram of an embodiment of a semiconductor manufacturing system 10 in which a service guide 55 may be implemented to facilitate data exchanges between various entities across a semiconductor production cycle. FIG. 1 is intended as an example, and not as an architectural limitation of embodiments described herein.

System 10 may be used in the design, development and manufacturing cycle and services related thereto in a semiconductor manufacturing cycle. System 10 may include a plurality of production or service entities including a design service facility 12 comprising, for example, a design house, design facility, or other production or service entity adapted to provide design services related to an end product. System 10 may include a wafer fabrication facility 14 that comprises a semiconductor wafer processing facility. System 10 also may include a mask facility 16 that comprises a semiconductor mask service provider. An assembly/test facility 20 may be included in system 10 and comprises a facility that may assemble and/or test one or more products. System 10 may include a failure analysis facility 22 that comprises a semiconductor product analysis facility adapted to evaluate product failures or anomalies. System 10 may include a component manufacturing facility 24 that manufacturers product components including semiconductor devices or apparatuses. System 10 may include an eFoundry facility 26 that provides coordination of various manufacturing, evaluation, testing, delivery, customer information services, or other services or facilities involved in any phase of a semiconductor product manufacture. System 10 may include a customer support facility 28 that provides services for facilitating product order placement and inquiries. System 10 may include a quality/reliability facility 30 that provides quality assurance and reliability services for the manufacture of semiconductor-based products. System 10 may also include additional service facilities 32 for any variety of other services that may be involved in the production, testing, evaluation, customer or information service, product delivery, or other suitable service. All system facilities may communicate electronically with one another via a network 65 which may be a global network such as the World Wide Web and the Internet or another suitable data exchange mechanism. Preferably, each facility 12-32 comprises a web service interface component that is operable to convert data in diverse formats into one or more web service message formats for transmission across network 65 to one or more other facilities using one or more transport protocols. System 10 may use web service formats and protocols now known, such as XML (eXtensible Markup Language), SOAP (Simple Object Access Protocol), WSDL (Web Services Description Language), UDDI (Universal Description, Discovery and Integration), HTTPR (Reliable HyperText Transport Protocol), web service formats and protocols to be developed in the future, or proprietary protocols. Facilities 12-32 may be commonly or individually operated, and one or more of facilities 12-32 may be collocated at a common locale. In other implementations, one or more of facilities 12-32 may be disposed at geographically diverse locations. FIG. 1 is intended as an example, and not as an architectural limitation, of embodiments described herein, and system 10 may be implemented without some depicted facilities, with other facilities substituted for one or more of those shown, or with additional facilities not shown. The particular facilities shown in system 10 are depicted for illustrative purposes to facilitate an understanding of the embodiments disclosed herein.

In accordance with an embodiment, a gateway 25 may be disposed within a premise of a production or service facility such as a semiconductor foundry. In the illustrative example, gateway 25 is located at a premise of a semiconductor foundry that includes wafer fabrication facility 14. Gateway 25 may be implemented as a data processing system, such as a web server, that maintains or interfaces with a customer library 35 implemented as, for example, a database maintained on a storage device, such as a hard disc storage device. Customer library 35 may be used to store records that define customer profiles, current customer orders, and historical information regarding fulfilled or completed customer orders. Gateway 25 may provide various access authorizations that facilitate access of customer or order information maintained in customer library 35. For example, authorization to a particular subset of data in customer library 35 may be granted to users at various service or production facilities. Additionally, read and write privileges may be defined for authorization to subsets of data in customer library 35. Additionally, authorizations to particular subsets of data in customer library may be granted to personnel of a customer entity having an order or product in production or that otherwise has an established relationship with one or more of the facilities.

Service guide 55 comprises one or more sets of computer-executable instructions that comprise routines, methods, objects or other logic and that may be fetched from a memory and executed by a processing unit of a data processing system of gateway 25. Service guide 55 may be implemented as computer-executable instructions on a computer-readable medium.

Figure 2:
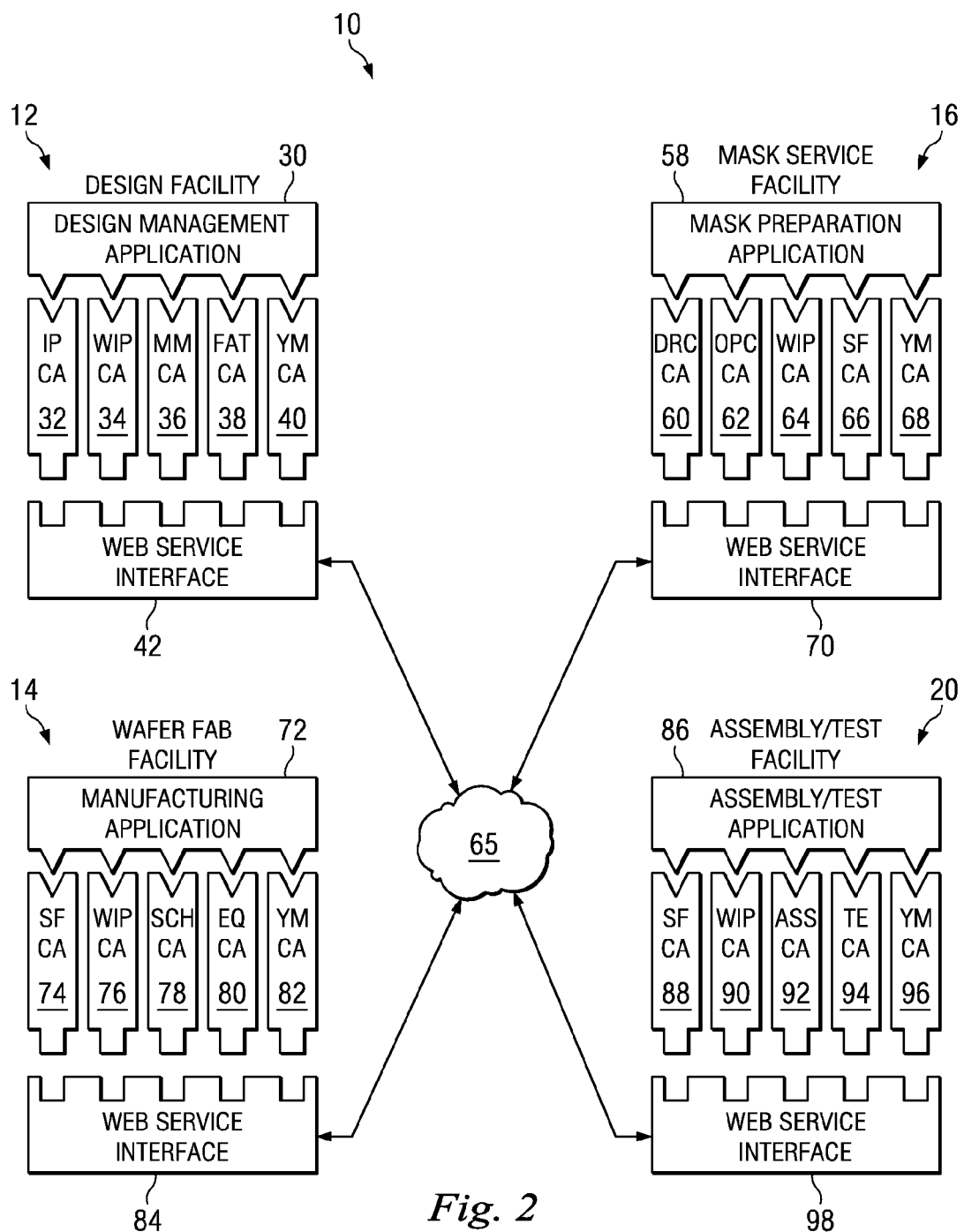
FIG. 2 is a more detailed block diagram of an embodiment of the system shown in FIG. 1.

FIG. 2 is a more detailed block diagram of an embodiment of system 10 shown in FIG. 1. As described above, system 10 comprises design service facility 12, wafer fabrication facility 14, mask facility 16, and assembly/test facility 20 having a predetermined framework for sharing data with one another over network 65. Each facility may comprise various components, including one or more of the following: a software tool or application, one or more engineering chain agents (ECA), and a web service interface. The software tool or application may provide a graphical user interface to receive user input, stored data and other information, and display information to a user. Each instance of the software application may possess functionality that is common among one or other application instances and each software application may possess functionality that is unique to that particular application instance. An engineering chain agent may be an intelligent agent object under a component-based framework operable to support applicable data types and formats, provide security, and provide reliable data exchange. A web service interface is operable to support transport and conversion of many data formats into web service formats.

Design facility 12 includes a design management application 30 that interfaces with the users or engineers at the design facility. Design management application 30 may be operable to oversee and control the device design process and may receive input from the users and display or otherwise output data to the users. Design management application 30 may also interface with a plurality of engineering chain agents in the design facility 12. The engineering chain agents may include an IP library engineering chain agent (CA) 32, a work-in-progress (WIP) engineering chain agent 34, a mask management engineering chain agent 36, a FAB/ASM/Test (FAT) engineering chain agent 38, and a yield management engineering chain agent 40. IP library engineering chain agent 32 may be operable to interface with the IP library service facility 40 or provider as well as the exchange of data therewith. WIP engineering chain agent 34 may be operable to manage and control the work flow of projects that are in the design process. Mask management engineering chain agent 36 may be operable to interface with and manage the data exchange with a mask facility 16 or provider. FAB/ASM/Test engineering chain agent 38 may be operable to interface with and manage the data exchange with a foundry or wafer fabrication facility 14 or provider and an assembly/test facility 20 or provider. Yield management engineering chain agent 40 may be operable to determine and manage the product yield from the fabrication process. Engineering chain agents 32-40 in the design facility 12 may also provide an interface between design management application 30 and a web service interface 42.

Mask facility 16 includes a mask preparation application 58 that interfaces with the users or engineers at mask facility 16. Mask preparation application 58 may be operable to assist in mask design and preparation and may receive input from the users and display or otherwise output data to the users. Mask preparation application 58 may also interface with a plurality of engineering chain agents in mask facility 16. The engineering chain agents may include a design rule checking (DRC) engineering chain agent 60, an optical proximity correction (OPC) engineering chain agent 62, a WIP engineering chain agent 64, a shop floor engineering chain agent 66, and a yield management engineering chain agent 68. Design rule checking (DRC) engineering chain agent 60 may be operable to interface and control the data exchange with a design rule checking process or software. Optical proximity correction (OPC) engineering chain agent 62 may be operable to interface and control data exchanges with the OPC process or software. WIP engineering chain agent 64 may be operable to provide an interface with the work-in-progress chain agent and control data access thereof. Shop floor engineering chain agent 66 may be operable to manage and control the data exchange with the shop floor. Yield management engineering chain agent 68 may be operable to determine and access data related to product yield data. Engineering chain agents 60-68 in the mask service facility 16 may also provide an interface between mask preparation application 58 and a web service interface 70.

Wafer fabrication facility 14 may include a manufacturing execution system application 72 that interfaces with the users or engineers at the foundry or wafer fabrication facility 14 or provider, or the manufacturing facility. Manufacturing execution system application 72 may be operable to support and manage the manufacturing process flow and may receive input from the users and display or otherwise output data to the users. Manufacturing execution system (MES) application 72 also interfaces with a plurality of engineering chain agents in wafer fabrication facility 14. The engineering chain agents may include a shop floor engineering chain agent 74, a WIP engineering chain agent 76, a scheduling engineering chain agent 78, an equipment engineering chain agent 80, and a yield management engineering chain agent 82. Shop floor engineering chain agent 74 may be operable to manage and control the data exchange with the shop floor. WIP engineering chain agent 76 may be operable to provide an interface with the work-in-progress and control data access thereof. Scheduling engineering chain agent 78 may be operable to provide data exchange with the manufacturing scheduling software and/or personnel. Equipment engineering chain agent 80 may be operable to provide support for the fabrication equipment and monitor their status. Yield management engineering chain agent 82 may be operable to determine and access data related to product yield data. Engineering chain agents 74-82 in the wafer fabrication facility 14 may also provide an interface between manufacturing execution system application 72 and a web service interface 84.

Assembly/test facility 20 includes an assembly/test application 86 that interfaces with the users or engineers at the product assembly and test facility. Assembly/test application 86 may receive input from the users and display or otherwise output data to the users. Assembly/test application 86 also interfaces with a plurality of engineering chain agents in the Assembly/test facility 20. The engineering chain agents may include a shop floor engineering chain agent 88, a WIP engineering chain agent 90, an assembly engineering chain agent 92, a test engineering chain agent 94, and a yield management engineering chain agent 96. Shop floor engineering chain agent 88 may be operable to manage and control the data exchange with the shop floor. WIP engineering chain agent 90 may be operable to provide an interface with the work-in-progress and control data access thereof. Assembly engineering chain agent 92 may be operable to monitor and control the assembly process and provide data exchange therewith. Test engineering chain agent 94 may be operable to monitor and control the testing process and provide data exchange therewith. Yield management engineering chain agent 96 may be operable to determine and access data related to product yield data. Engineering chain agents 88-96 in the assembly/test facility 20 also provide an interface between assembly/test application 86 and a web service interface 98.

Other facilities 22-32 may be configured similar to those depicted in FIG. 2. Preferably, each of service facilities 22-32 include a web service interface, appropriate facility applications for users at the respective facilities, and may include various chain agents that facilitate collection, management, processing, or other operations of facility service information.

FIG. 3 is a diagrammatic representation of an embodiment of a product menu 300 that may be provided by gateway 25 that facilities operation of service guide 55 in a semiconductor manufacturing system. Product menu 300 may be, for example, provided as a web page with various product design criterion that are selectable by a user. In the illustrative example, product menu 300 includes various selectable product attributes that describe a particular characteristic or parameter of a customer order. Various product attributes may be grouped or otherwise associated with a particular attribute class 310-312. For example, various selectable attributes 310a-310r may be associated with a product application, such as DRAM, Embedded DRAM, and the like. Other selectable attributes 311a-311x may be associated with a technology geometry. In a similar manner, other selectable attributes 312a-312i may be associated with an input/output voltage of the design product. The product attributes and attribute classes shown are exemplary only, and various other product attributes and attribute classes may be used in addition to, or in lieu of, one or more of the attributes and attribute classes shown.

In an embodiment, selected attributes are used, in part, by gateway 25 to generate a master code that facilitates operation of service guide 55. FIG. 4 is a diagrammatic illustration of a data structure 400 that provides an association between product attributes and codes that may be used for generation of a master code. Illustrative data structure 400 is implemented as a table although other data structures may be suitably substituted therefor. Data structure 400 comprises a plurality of records 420 and fields 430. Table 400 may be stored on a storage medium, fetched therefrom by a processor of gateway 25, and processed thereby.

Each record $420_1$-$420_{49}$, or row, comprises data elements in respective fields $430_1$-$430_3$. Each of fields $430_1$-$430_3$ have a respective label, or identifier, that facilitates insertion, deletion, querying, or other data operations or manipulations of data structure 400. In the illustrative example, fields $430_1$-$430_3$ have respective labels of "Attribute", "Att_Class", and "Code." A particular field, e.g., field $430_1$, may be designated as a key field and each respective data element is unique within key field $430_1$. Assignment of unique values to data elements of key field $430_1$ provides an identifier for records $420_1$-$420_{49}$ and the collection of data elements of key field $430_1$ is typically referred to as an index. Addressing a particular record $420_1$-$420_{49}$ via an associated data element of key field $430_1$ is referred to as indexing of record $420_1$-$420_{49}$. Alternatively, a key may be obtained by a function, e.g., a hashing function, that indexes a particular record $420_1$-$420_{49}$.

In the illustrative example, each product attribute identified in field $430_1$ is associated with an attribute class (Att_Class) and an attribute code. An attribute class comprises one or more product attributes that describe a common design criterion. For example, a plurality of attributes 310a-310r may describe a product application. An attribute code specified in field $430_3$ may define a unique code for a particular attribute identified in field $430_1$ of a corresponding record.

In accordance with an embodiment, selected product attributes may be used, at least in part, to derive a master code that is assigned or otherwise associated with a customer or customer order. In one implementation, attribute codes defined in field $430_3$ are used to form portions of a master code assigned to a customer order.

FIG. 5A is a diagrammatic illustration of an exemplary master code 500 format that facilitates implementation of a service guide in a manufacturing system, such as a semiconductor manufacturing system. Master code 500 includes various constituent segments 511-512. In the illustrative example, master code 500 comprises a basic service code segment 511 and a configure-to-service code segment 512. Each of code segments 511-512 may include one or more sub-segments or fields as described more fully hereinbelow.

Each of segments 511-512 may be assigned values, e.g., numeric, alpha-numeric, or values of another suitable format, from which various attributes of a product order may be determined. To this end, one or more segments 510-511, or constituent sub-segments or fields thereof, may have values assigned thereto to properly indicate a corresponding product order attribute. For example, basic service code segment 511 may comprise a value that is statically assigned and that is based, for example, on the customer and attributes of a product order. FIG. 5B illustrative an exemplary embodiment of a statically assigned basic service code segment 511. In the present example, basic service code segment 511 includes a customer code sub-segment 511a that is an identifier uniquely assigned to a particular customer. In accordance with embodiments disclosed herein, one or more sub-segments 511b-511d are derived or assigned to basic service code 511 from customer order attributes. For example, a technology code sub-segment 511b may be assigned a value that is derived or associated with, at least in part, a code assigned to a technology classification corresponding to a product order. For example, each of the technology attribute classes 311a-311x depicted in FIG. 3 may have a respective code assigned thereto. In a similar manner, each of the application attribute classes 310a-310r and voltage attribute classes 312a-312i may respectively have a code assigned thereto. The code assigned to the attribute class, or a value derived therefrom, corresponding to the customer's product order technology attribute class may be assigned to technology code sub-segment 511b. In a similar manner, voltage code sub-segment 511c may have a value assigned thereto that corresponds to a code assigned to a voltage attribute class, such as one of voltage attribute classes 312a-312i depicted in FIG. 3, corresponding to the input/output voltage of the customer's order. Likewise, application code sub-segment 511d may have a value assigned thereto that corresponds to a code assigned to an application attribute class, such as one of application attribute classes 310a-310r depicted in FIG. 3, corresponding to the application of the customer's order. In the present example, each of the basic service code sub-segments 511a-511d are concatenated with hyphenated delimiters, although other mechanisms may be implemented for deriving basic service code segment 511 from sub-segments 511a-511d. FIG. 5C depicts an example of a basic service code segment comprising constituent sub-segments 521a-521d. In the illustrative example of FIG. 5C, customer code sub-segment 521a comprises a value "A999" that is uniquely assigned to a particular customer. Technology code sub-segment 521b comprises a value "CL013G11001" assigned to a particular technology attribute class, such as one of technology attribute classes 311a-311x, that corresponds to the technology class of the customer's product order. In a similar manner, voltage code sub-segment 521c and application code sub-segment 521d have values of "B193000" and "01", respectively, that are assigned to one of voltage attribute classes 312a-312i and application attribute classes 310a-310r that correspond to the voltage and application attributes of the order to which the basic service code segment is assigned.

Returning again to FIG. 5A, configure-to-service code segment 512 may comprise a summation of various service routing codes and associated order data. Configure-to-service code segment 512 comprises a value that may be derived in part of service or product order features of the product order, and may have values of constituent sub-segments assigned thereto that provide an indication of a service stage at which the product order is currently being processed. FIG. 5D depicts an embodiment of an exemplary configure-to-service code segment 512 format. In the illustrative example, configure-to-service code segment 512 comprises a summation of one or more service routing code sub-segment 512a, a service offering code sub-segment 512b, a service element code sub-segment 512c, and a order data code sub-segment 512d. The value of configure-to-service code segment 512 may be dependent on various service offerings and service elements associated with the order that may be implemented as pre-defined coded stages of the product order.

In a particular implementation, service routing code sub-segment 512a may comprise an automatically generated code that is dependent on order characteristics, such as selected service offerings associated with the product order, services stages applicable to the order, or other data associated with the product order. The service routing code sub-segment 512a may be statically assigned to the product order such that the value thereof remains constant throughout the product service cycle, i.e., that is from product order placement to shipment of a final product.

Service offering code sub-segment 512b may comprise a value that is assigned to particular service stages of a product order and may provide an identification of a current service stage at which the product order is being processed. For example, with reference again to FIG. 1, various facilities deployed in system 10 may have a service offering code associated therewith. In the depicted example, design service facility 12 has a service offering of "01" associated therewith, wafer FAB facility 14 has a service offering of "02" associated therewith, mask service facility 16 has a service offering code of "03" associated therewith, failure analysis facility 22 has a service offering code of "04" associated therewith, assembly/test facility 20 has a service offering code of "05" associated therewith, component manufacturing facility 24 has a service offering code of "06" associated therewith, eFoundry facility 26 has a service offering code of "07" associated therewith, quality/reliability facility 30 has a service offering code of "08" associated therewith, and additional services facility 32 has a service offering code of "09" associated therewith. A service offering code, as referred to herein, comprises an identifier, such as a numerical or other identifier, that is uniquely associated with a particular service entity. The service code value assigned to service offering code sub-segment 512b may be dynamically assigned based on the particular service stage at which the product order is being processed. For example, assume a product order is being processed at mask service facility 16. While the product is being processed at the mask service facility, the service offering code sub-segment 512b may have a value of "03" assigned thereto to properly indicate the current service stage of the product order. When the product is shipped from the mask service facility to another facility, the service offering code sub-segment 512b value may be updated accordingly to properly indicate the new service stage of the product order.

Service element code sub-segment 512c may comprise a value that is associated with a particular service stage of a service facility. Various service providers or facilities may have a plurality of distinct service stages that may be assigned a service element code thereto. For example, mask service facility 16 depicted in FIG. 1 may include mask making, mask revision, mask cleansing, and mask storage stages that each have a respective code assigned thereto, such as "001A"-"004A", respectively. As the product order progresses thorough various stages of a particular service facility, the service element sub-segment 512c may be updated accordingly to provide an indication of the particular processing stage within the current service facility at which the product order is being processed.

Order data code sub-segment 512d may have a value assigned thereto that is dependent on various order characteristics or attributes of the product order, such as the date on which the product order was placed, the schedule of the product order, the quantity of the product order, or other attributes that may characterize the product order.

In one embodiment, a code segment or sub-segment, such as technology code sub-segment 511b, may be assigned values derived from customer order attributes and may be directly obtained from attribute codes. For example, technology code sub-segment 511b may have a value that, at least in part, is assigned thereto based on an attribute code(s) read from field $430_1$ of records 420 depicted in FIG. 4. In the event more than one attribute is selected for a particular product attribute that has a corresponding code segment or sub-segment, a plurality of attribute codes read from data structure 400 may be used to derive a value that is assigned to a segment or sub-segment. For example, a plurality of product attribute codes may be concatenated to form a code sub-segment or a portion thereof. In yet another embodiment, a plurality of product attribute codes may be supplied as input parameters to a hashing algorithm or other suitable routine to obtain a value that is assigned to a sub-segment, or a portion thereof. Other mechanisms may be implemented to obtain values assigned to code segments and sub-segments that are dependent on one or more product or service attributes, and such mechanisms may be suitably substituted for those exemplary mechanisms described. Other sub-segments, such as application code sub-segment 511d, may have values assigned thereto that are similarly derived from product order attributes. Service guide code sub-segments 551b and 511d derived from product attributes are illustrative only, and various other product attributes and product attribute classes may be used in addition to, or in lieu or, one or more of the described product attributes and attribute classes.

With reference now to FIG. 5E, there is shown a diagrammatic representation of an embodiment of master code 500 depicting code segments and sub-segments. Master code 500 comprises basic service code segment 511 and configure-to-service code segment 512. In the illustrative example, basic code segment 511 includes fields or sub-segments including customer code sub-segment 511a, technology code sub-segment 511b, and an application code sub-segment 511d. In the present example, the customer code sub-segment has a value of A999, the technology code sub-segment has a value of CL013G, and the application code sub-segment has a value of B193000 that each may be derived or assigned as described above with reference to FIG. 5B. Configure-to-serve code segment 512 comprises service routing code sub-segment 512a having a value AAA0018, service offering code sub-segment 512b having a value "03", service element code sub-segment 512c having a value "001A", and order data code sub-segment 512d having a value "CXX". Sub-segments 512a-512d of configure-to-service code segment 512 may have values derived or assigned thereto as described above with reference to FIG. 5D. The value of service offering code sub-segment 512b is preferably uniquely associated with the particular facility at which the product order is being processed, and the value of service element code sub-segment 512c is preferably uniquely associated with a particular processing stage of the facility identified by service offering code sub-segment 512b. In this manner, service offering code sub-segment 512a and service element code sub-segment 512c may be dynamically updated to identify a particular processing stage of the product order.

Preferably, each facility that provides any product order service may access service guide 55 to update master code 500 when appropriate. In one embodiment, each service facility may access service guide 55 on receipt of the product order. In this manner, a service facility may update configure-to-service code segment 512 on initial receipt of the product order so that master code 500 accurately indicates the current facility that is processing the product order. As the product order proceeds through stages of a particular service facility, the service facility may access service guide 55 and make additional revisions to particular fields, such as service element sub-segment 512c, of master code 500 to accurately reflect the current product processing stage.

Advantageously, a customer or service facility may access service guide 55 and query master code 500 for various product order attributes. In particular, basic service code segment 511 and configure-to-service code segment 512 may be queried and interpreted to identify various product order attributes. Accordingly, master code 500 provides an efficient mechanism for tracing product order progress by both customers and service providers. Moreover, the configuration of master code 500 allows for service expansion. For example, assume an additional service facility is added to system 10 depicted in FIG. 1. Various service stages of the new facility may be identified, assigned codes thereto, and master code 500 may then have additional segments and/or sub-segments added thereto to accommodate the newly added service facility.

Gateway 25 preferably receives information regarding a product from facilities 12-32 when the respective facility is in receipt of the product or has otherwise performed a service (or is in preparation to perform a particular process or service). Information conveyed to gateway 25 regarding a particular product is preferably made in association with a master code, or a portion thereof, assigned or associated with the product. Gateway 25, on receipt of the information, may identify the master code and update information records related thereto. In one embodiment, various data structures 45a-45n (illustratively designated DS_1-DS_6 in FIG. 1) maintained (or accessible) by gateway 25 may be generated or updated with processing information supplied to gateway 25 by facilities 12-32. Each of data structures 45a-45n may be associated with (or maintain information provided by) one of facilities 12-32, although in other embodiments a single data structure may be associated with (or maintain information provided by) more than one of facilities 12-32. Additionally, gateway 25 may update a configure-to-service code segment included with the master code. In this manner, gateway 25 maintains an up to date record of the service stage of a product in association with a master code.

FIG. 6A is a diagrammatic illustration of an embodiment of a mapping table that may be maintained or accessible by gateway 25 that facilitates recording of a service stage of a semiconductor product. Mapping table 600 comprises a plurality of records 620 and fields 630. Table 600 may be stored on a storage medium, fetched therefrom by a processor of gateway 25, and processed thereby.

Each record $620_1$-$620_3$, or row, comprises data elements in respective fields $630_1$-$630_2$. Each of fields $630_1$-$630_2$ have a respective label of "Master Code" and "Service Stage." In the illustrative example, each master code identified in field $630_1$ is logically associated with a service stage identified in field $630_2$ of a common record. The service stage identifies a processing stage or service offering at which a product associated or assigned to the master code is currently located. As gateway 25 receives additional information from one or more production or service facilities, the service stage value of field $630_1$ may be automatically updated by the gateway to properly indicate the current processing stage of a product associated with a corresponding master code. Illustrative table 600 includes there records $620_1$-$620_3$ and thus may provide master code to service stage mappings for three customers. However, any number of customer master codes to service stage mappings may be maintained by table 600. In other implementations, the service stage may be included in the master code as, for example, a service offering code, and thus a master code may be fetched from table 600 and the portion of the master code that defines the service offering code may be modified to indicate the current service offering or processing facility at which the product order is currently being processed.

FIG. 6B is a diagrammatic illustration of an embodiment of a mapping table 650 that may be maintained or accessible by gateway 25 that facilitates conveyance of semiconductor product manufacturing process data to a user of a service guide in a semiconductor manufacturing system. Mapping table 650 comprises a plurality of records 660 and fields 670. Table 650 may be stored on a storage medium, fetched therefrom by a processor of gateway 25, and processed thereby.

Each record $660_1$-$660_6$, or row, comprises data elements in respective fields $670_1$-$670_2$. Each of fields $670_1$-$670_2$ have a respective label of "Service Stage" and "Data_Structure." In the illustrative example, each service stage identified in field $670_1$ is logically associated with a data structure identified in field $670_2$ of a common record. The service stage of field $670_1$ identifies a processing stage, e.g., a service element code sub-segment 512c value, at which a product associated therewith is currently located. As a user logs onto or engages in communications with gateway 25, a service guide run by gateway 25 may identify a service stage associated with the user and interrogate table 650 with the service stage to obtain a data structure, or identity thereof, from field $670_2$. The service guide may then fetch the data structure, or a portion thereof, and convey information of the fetched data structure to the user. In the illustrative example, each of service stages 01-06 identified in field $670_1$ is associated with a data structure DS_1-DS_6. In this manner, gateway 25 may fetch, query, or otherwise interface with a particular data structure 45a-45n dependent on what particular processing stage a customer order is in when gateway 25 is accessed by a customer. Data elements of field $670_2$ may comprise, for example, names or labels of a respective data structure 45a-45n associated with the master code assigned to the customer, an address of the respective data structure, or another reference to the respective data structure.

In accordance with an embodiment, information regarding customer product orders may be provided to a customer by way of a plug-in or other program provided to a customer data processing system. In one implementation, a customer may contact a sales person or other personnel at a production or service facility. An account may be created for the customer including a customer code. An email may be transmitted to an authorized email address of the customer that includes a link to a plug-in page. The plug-in may be configured to interact with gateway 25 and service guide 55 run thereby and automatically link to a login page provided by gateway 25. The plug-in and gateway may then engage in communications that facilitate delivery of product processing information to the customer.

Figure 7:
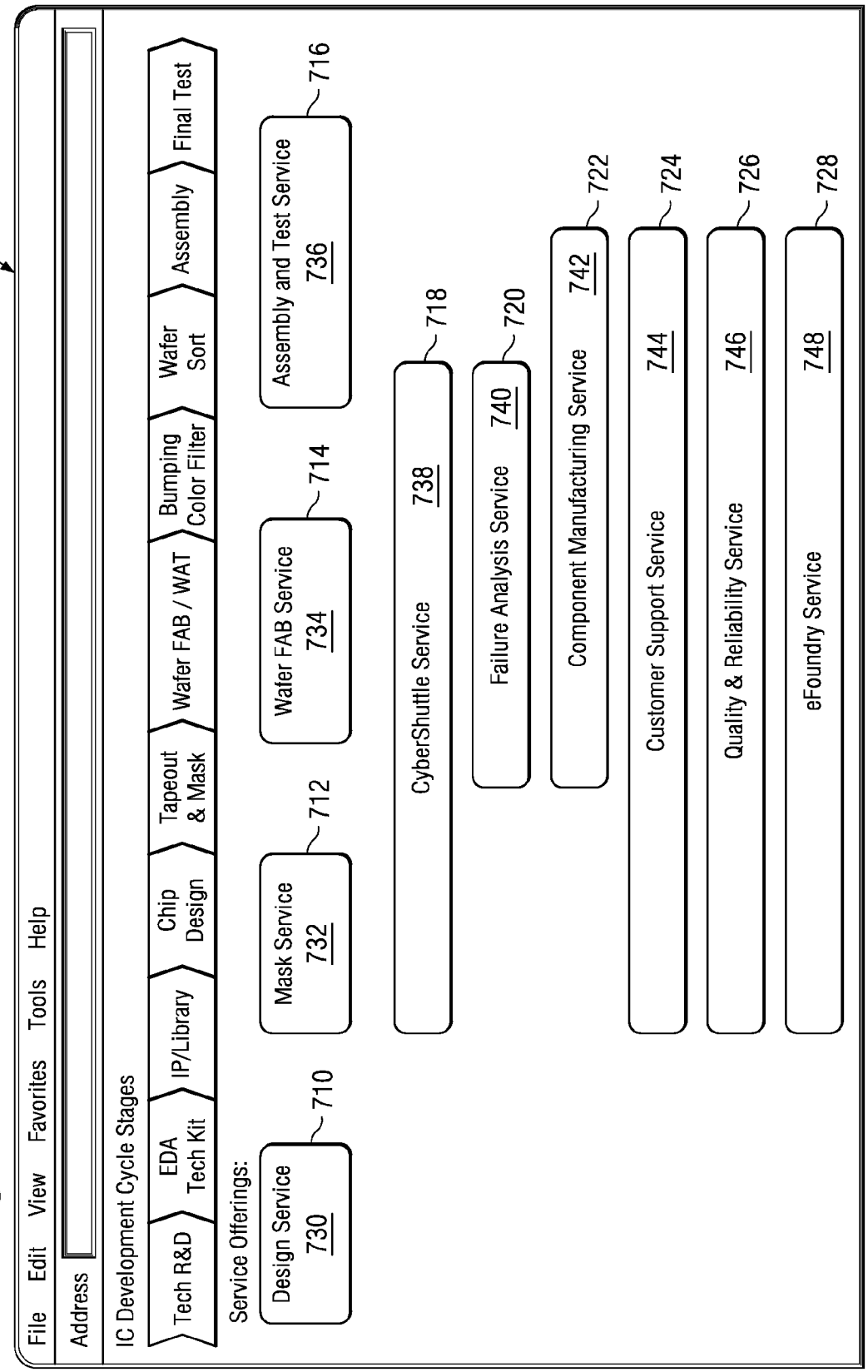
FIG. 7 is a diagrammatic illustration of an embodiment of a service guide page that may be provided to a user of a service guide in a semiconductor manufacturing system.

FIG. 7 is a diagrammatic illustration of an embodiment of a service guide page 700 that may be provided to a user of service guide 55 in a semiconductor manufacturing system. Service guide page 700 may be provided to a user when the user logs into gateway 25. Service guide page 700 may include various graphical objects associated with particular production or service stages of a semiconductor manufacturing process. In the illustrative example, service guide page 700 includes a design service object 710, a mask service object 712, a wafer FAB service object 714, an assembly and test service object 716, a cybershuttle service object 718, a failure analysis service object 720, a component manufacturing service object 722, a customer support service object 724, a quality and reliability service object 726, and an eFoundry service object 728.

Each of service objects 710-728 displayed in page 700 may be selected by a user. Preferably, each service object 710-728 is logically associated with one or more data structures. For example, service objects 710-728 may each include a respective link 730-748 that references or is otherwise logically associated with another web page or data structure. For example, assume data structure 45a shown in FIG. 1 comprises a data structure that maintains information regarding the design stage of a product order, e.g., product processing information supplied to gateway 25 by design facility 12. In this example, selection of link 730 of design service object 710 may result in the service guide fetching or otherwise interfacing with data structure 45a and returning, at least in part, a portion of the information maintained in data structure 45a to the user. The plug-in run by the customer's data processing system may receive the information retrieved from data structure 45a, e.g., in the form of a web page, and display the data in a graphical user interface. In a similar manner, mask service object 712, wafer FAB service object 714, and assembly and test service object 716 may be logically associated with a respective data structure 45b-45n. Selection of one of service object 712-716 may result in transmission of information, or a portion thereof, maintained in data structures 45b-45n to the customer data processing system.

Link 738 in cybershuttle service object 718 may reference a web page or data structure that provides an interface or information of a "cybershuttle" service that allows multiple users to share a mask set for fast prototyping of products. Link 740 in failure analysis service object 720 may reference a web page or data structure that provides failure analysis services for product designs. Link 742 of component manufacturing service object 722 may reference a web page or data structure that provides component manufacturing services. A customer support web page or data structure may be accessed by selection of link 744 in customer support service object 724. A quality and reliability service web page or data structure may be accessed by selecting link 746 in quality and reliability service object 726. An eFoundry service web page or data structure may be access by selecting eFoundry service object 728. The service objects and corresponding links shown in FIG. 7 are illustrative and other service objects and links may be used in addition to, or in lieu of, the service objects and links shown in FIG. 7.

Figure 8:
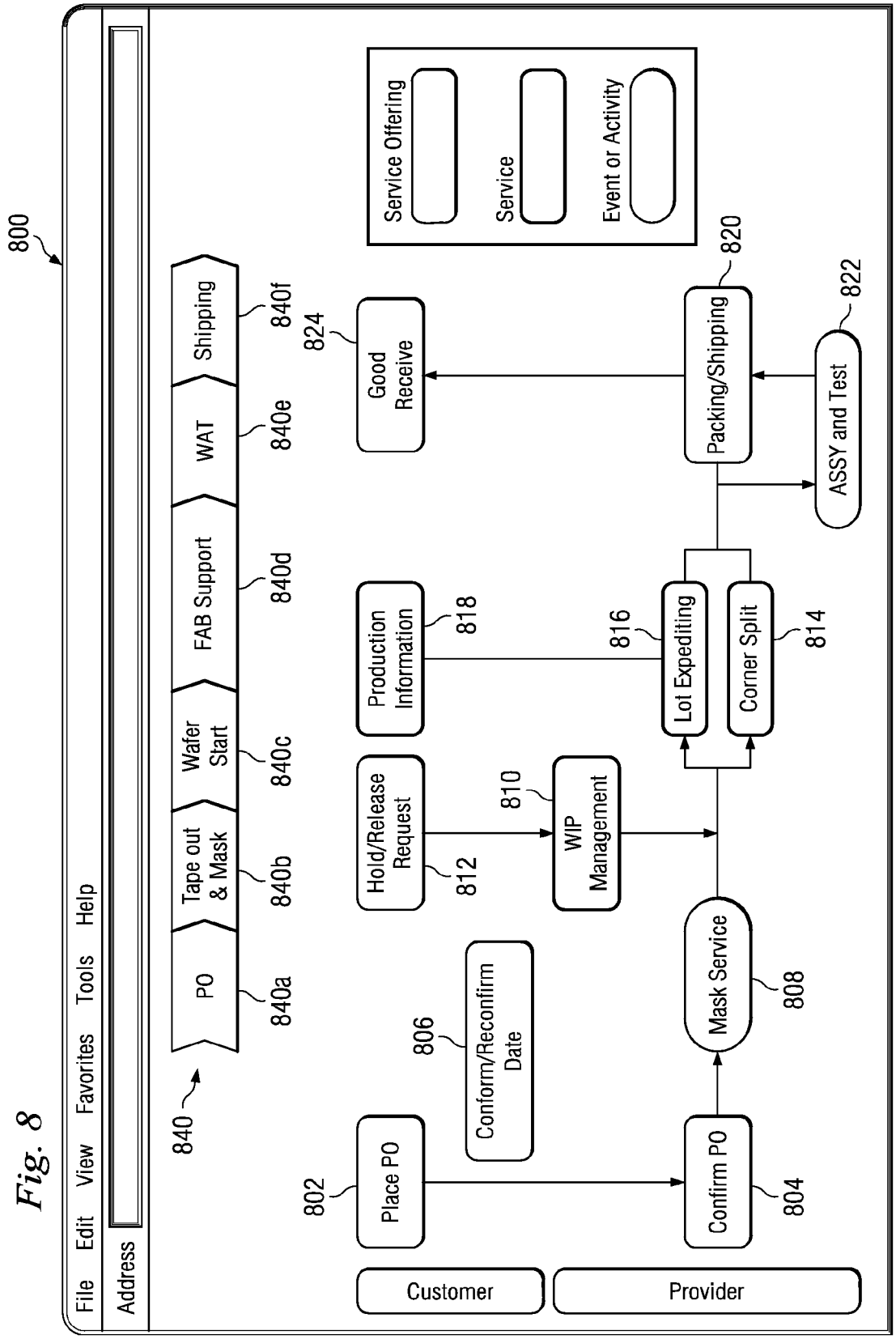
FIG. 8 is a diagrammatic representation of a service flow chart that may be provided by a service guide run by a gateway and transmitted to a user in a semiconductor manufacturing system.

In accordance with another embodiment, service guide 55 may provide a service flow chart that provides a visual indication of the production processes and inter-relations thereof to a user. A service flow chart may be produced by service guide 55 that shows inter-related production processes of a particular semiconductor processing stage. FIG. 8 is a diagrammatic representation of a service flow chart 800 that may be provided by service guide 55 run by gateway 25 and transmitted to a user in a semiconductor manufacturing system. Service flow chart 800 is representative of a service flow chart that depicts production processes of a wafer FAB service. Service flow chart 800 may include various objects 802-822 that provide graphical, textual, or other indicia that specify information relating to a particular processing stage. In the present example, service chart 800 comprises a wafer FAB service chart and includes various objects that provide information relating to services, events or other data that may be provided, performed, or otherwise offered by a wafer FAB facility, such as facility 14 shown in FIG. 1. Objects 802-822 may be graphically displayed in an inter-related manner to indicate the order of various processing stages or events that may occur at the wafer FAB facility. For example, a mask service may be offered subsequent to a confirmation of a product order (PO) as indicated by the directional connection between objects 804 and 808. Additionally, service objects may comprise various information types and may have visual or other indicia indicating the particular information type specified thereby. For example, objects 808 and 822 are displayed as oval shaped objects and indicate a service offering. Objects 810 and 814-818 are displayed with highlighted borders and indicate a particular service provided in the current processing stage (wafer FAB in the current example). Other objects, such as objects 802-806, 812, 820 and 824 are displayed as rectangular objects and indicate an event or activity. Some objects may be selectable by a user and link to additional pages or data structures to provide a user with additional information or that provide a user with options to enter information. Objects in service flow chart 800 may link to a particular portion of a data subset 45a-45n that is associated with the processing stage depicted by service flow chart 800.

A progress indicator 840 may be included that comprises various progress stage indicators 840a-840f that provide various processing sub-stages of the product process depicted by service flow chart 800. One of stage indicators 840a-840f may be distinctly displayed from the other indicators to provide a visual indication of a current processing stage of a product.

Figure 9:
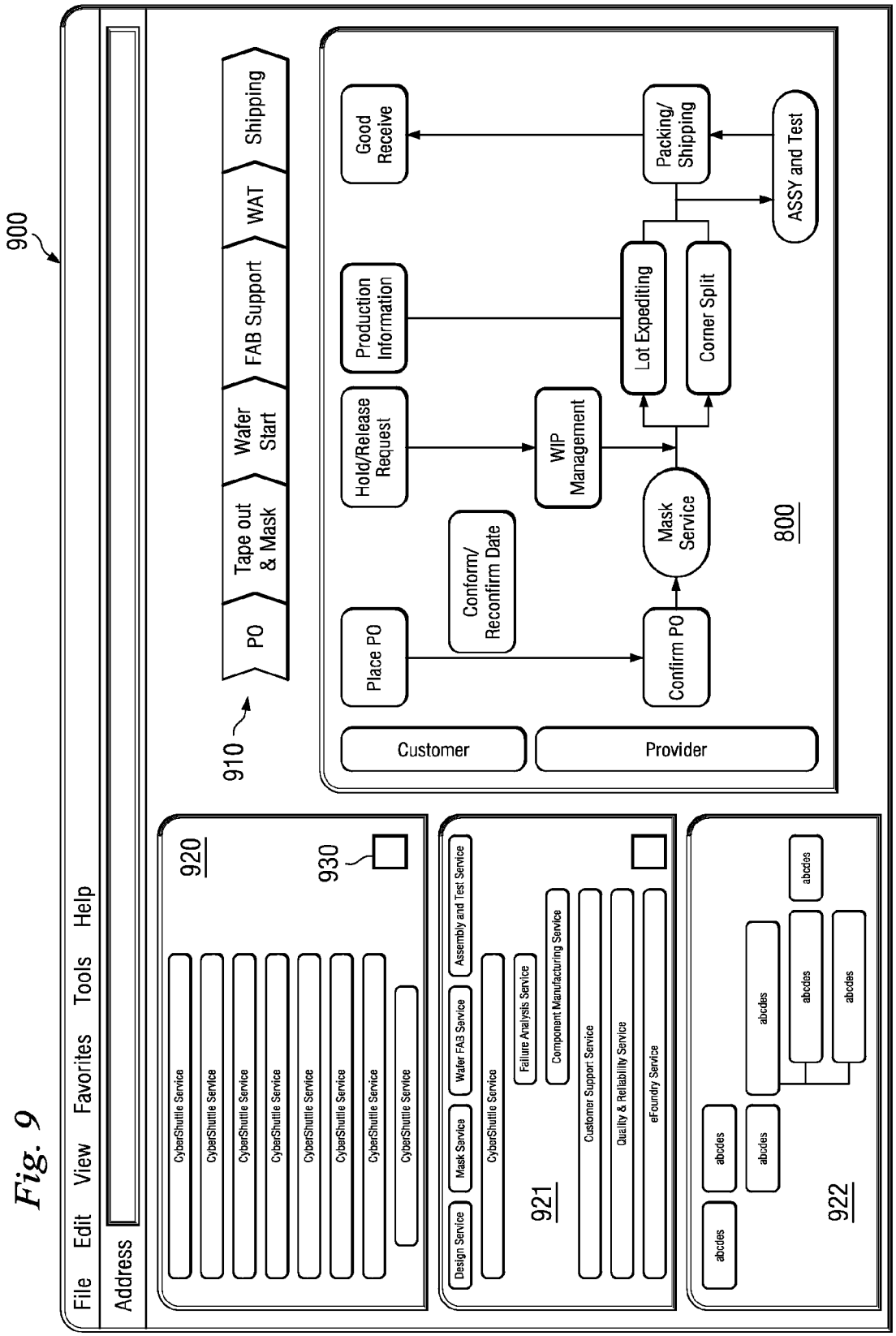
FIG. 9 is a diagrammatic representation of another user interface that may be provided by a service guide to facilitate product order tracking in a semiconductor manufacturing system.

FIG. 9 is a diagrammatic representation of a user interface 900 that may be provided by service guide 55 to facilitate product order tracking in a semiconductor manufacturing system. Interface 900 may include a primary display area 910 and one or more subordinate display areas 920-922. In the illustrative example, primary display area 910 includes service flow chart 800 depicted in FIG. 8, and subordinate display areas 920-922 respectively include a service flow chart of different manufacturing production process stages. Each of subordinate display areas 920-922 may include a control that may be selected to interchange the contents of the selected subordinate display area with contents of the current primary display area. For example, subordinate display area 920 has a selectable control 930 displayed therein. Response to selection of control 930, the contents of subordinate display area 920 may be exchanged with the contents of primary display area 910. When a user logs in with gateway 25, an evaluation of the service stage may be made by identification of the master code and the corresponding service stage, e.g., by identification of the service offering code sub-segment 512b and the service element code sub-segment 512c maintained in the configure-to-service code segment 512, currently associated with or included in the master code. Service guide 55 may then format user interface 900 to display a service flow chart (or other information) that is associated with a current service stage of the customer's product order.

Implementations of the present disclosure provide for a "Configure to Service" based business system and method that provides for fast flexible and responsive methodologies with various values and benefits. The system may be configured and respond to changing system infrastructure and functionality. Business transactions may be based on customer's real-time preferences for different types of service combinations thereby allowing a company or service provider to develop real-time marketing and dynamic services. Implementations may provide for plug and features that enable rapid integration with a company's alliance ecosystem and in-house service. This provides for scalability and flexibility to meet customer needs. Tracking and leverage may be provided in a traceable "service master" information query function along the entire end to end value chain that may assist customer and service providers in the company's ecosystem to access and leverage required information easily and efficiently.

Aspects of the present invention may be implemented in software, hardware, firmware, or a combination thereof. The various elements of the system including the system guide, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of manufacturing a semiconductor product ordered by a customer, comprising:
communicatively coupling a customer library with a manufacturer gateway, thereby creating a service guide that is configured to provide information exchanges between a manufacturing service provider and the customer;
deriving a first code segment from a customer code uniquely associated with the customer;
deriving at least one additional code segment from at least an identifier of a service offering provided by a service provider currently manufacturing the semiconductor product;
generating a configure-to-service code in a service guide system from the first code segment and the at least one additional code segment; and
performing the service offering with respect to the semiconductor product.

2. The method of claim 1, further comprising:
logically associating a service offering code with the configure-to-service code, wherein the service offering code is assigned to the service provider.

3. The method of claim 1, further comprising:
identifying delivery of the semiconductor product from the service provider to a second service provider; and
identifying a service offering of the second service provider.

4. The method of claim 3, further comprising replacing the association of the service offering code with a second service offering code, wherein the second service offering code is assigned to the second service provider.

5. The method of claim 1, further comprising:
identifying a service stage of the service provider at which the semiconductor product is being processed; and
logically associating a service element code with the configure-to-service code, wherein the service element code is associated with the service stage.

6. The method of claim 5, wherein the service stage is one of a plurality of service stages of the service provider.

7. A method of manufacturing a semiconductor product in a multi-stage production system, comprising:
communicatively coupling a customer library with a manufacturer gateway, thereby creating a service guide that is configured to provide information exchanges between a manufacturing service provider and a customer;

obtaining a configure-to-service code associated with a customer order, wherein the configure-to-service code includes a service offering code of a service provider currently manufacturing the semiconductor product and a service element code associated with a service stage of the service provider at which the semiconductor product is being processed;

interrogating the customer library with at least one of the service offering code and the service element code to obtain manufacturing data related to the semiconductor product; and manufacturing the semiconductor product in accordance with the manufacturing data.

8. The method of claim 7, further comprising retrieving information related to the service stage.

9. The method of claim 7, wherein the customer library comprises a customer reference information repository and customizable information pool including business engagement historical records.

10. A computer-readable medium having computer-executable instructions for execution by a processing system, the computer-executable instructions, comprising:

instructions that communicatively couple a customer library with a manufacturer gateway, thereby creating a service guide that is configured to provide information exchanges between a manufacturing service provider and a customer;

instructions that derive a first code segment from a customer code uniquely associated with the customer;

instructions that derive at least one additional code segment from at least an identifier of a service offering provided by a service provider currently manufacturing a semiconductor product ordered by the customer; and instructions that generate a configure-to-service code in a service guide system from the first code segment and the at least one additional code segment.

11. The computer-readable medium of claim 10, further comprising:

instructions that logically associate a service offering code with the configure-to-service code, wherein the service offering code is assigned to the service provider.

12. The computer-readable medium of claim 10, further comprising:

instructions that identify delivery of the semiconductor product from the service provider to a second service provider; and instructions that identify a service offering of the second service provider.

13. The computer-readable medium of claim 12, further comprising instructions that replace the association of the service offering code with a second service offering code, wherein the second service offering code is assigned to the second service provider.

14. The computer-readable medium of claim 10, further comprising:

instructions that identify a service stage of the service provider at which the semiconductor product is being processed; and instructions that logically associate a service element code with the configure-to-service code, wherein the service element code is associated with the service stage.

15. The computer-readable medium of claim 14, wherein the service stage is one of a plurality of service stages of the service provider.

16. The computer-readable medium of claim 10, further comprising instructions that interrogate a customer library with the configure-to-service code.

17. The computer-readable medium of claim 16, further comprising instructions that retrieve information related to a service stage of a service provider processing the semiconductor product.

18. The computer-readable medium of claim 16, wherein the customer library comprises a customer reference information repository and customizable information pool including business engagement historical records.

19. A system for manufacturing a semiconductor product, comprising:

a customer library communicatively coupled with a manufacturer gateway, thereby creating a service guide that is configured to provide information exchanges between a plurality of service providers and a customer;

the plurality of service providers each providing a respective service offering having a service offering code associated therewith, wherein the plurality of service providers each perform the respective service offering to manufacture the semiconductor product; and a service guide comprising a customer information repository adapted to generate a configure-to-service code that includes a first code segment uniquely associated with the customer and at least one additional code segment associated with at least an identifier of a service offering provided by a first of the plurality of service providers, wherein the first service provider is currently manufacturing a semiconductor product ordered by the customer.

20. The system of claim 19, wherein the service guide identifies a service offering of a service provider of the plurality of service providers that is processing the semiconductor product and logically associates a service offering code with the configure-to-service code, wherein the service offering code is assigned to the service provider.

21. The system of claim 19, wherein the service guide identifies delivery of the semiconductor product from the service provider to a second service provider and identifies a service offering of the second service provider.

22. The system of claim 21, wherein the service guide replaces the association of the service offering code with a second service offering code, wherein the second service offering code is assigned to the second service provider.

23. The system of claim 19, wherein the service guide identifies a service stage of the service provider at which the semiconductor product is being processed, and logically associates a service element code with the configure-to-service code, wherein the service element code is associated with the service stage.

24. The system of claim 23, wherein the service stage is one of a plurality of service stages of the service provider.

25. An apparatus, comprising:

means for communicatively coupling a customer library with a manufacturer gateway, thereby creating a service guide that is configured to provide information exchanges between a manufacturing service provider and a customer;

means for deriving a first code segment from a customer code uniquely associated with the customer;

means for deriving at least one additional code segment from at least an identifier of a service offering provided by a service provider currently manufacturing a semiconductor product ordered by the customer;

means for generating a configure-to-service code in a service guide system from the first, code segment and the at least one additional code segment;

means for interrogating a customer library with the configure-to-service code to obtain manufacturing data related to the semiconductor product; and means for manufacturing the semiconductor product in accordance with the manufacturing data.

26. The apparatus of claim 25, further comprising:

means for logically associating a service offering code with the configure-to-service code, wherein the service offering code is assigned to the service provider.

27. The apparatus of claim 25, further comprising:

means for identifying delivery of the semiconductor product from the service provider to a second service provider; and means for identifying a service offering of the second service provider.

28. The apparatus of claim 27, further comprising means for replacing the association of the service offering code with a second service offering code, wherein the second service offering code is assigned to the second service provider.

29. The apparatus of claim 25, further comprising:

means for logically associating a service element code with the configure-to-service code, wherein the service element code is associated with the service stage.

30. The apparatus of claim 29, wherein the service stage is one of a plurality of service stages of the service provider.

* * * * *